United States Patent [19]

Huntington

[11] 3,744,929

[45] July 10, 1973

[54] BLOWER AND FAN WHEEL APPARATUS

[76] Inventor: Richard L. Huntington, Route 1, Van Buren, Ohio

[22] Filed: May 11, 1971

[21] Appl. No.: 142,183

[52] U.S. Cl. .............................................. 416/145
[51] Int. Cl. ............................................. F04d 29/00
[58] Field of Search ............................. 416/144, 145

[56] References Cited
UNITED STATES PATENTS

| | | |
|---|---|---|
| 2,323,637 | 7/1943 | Williams ........................ 416/144 X |
| 2,340,427 | 2/1944 | Putt .................................... 416/144 |
| 2,576,105 | 11/1951 | Childs ............................ 416/145 X |
| 2,722,848 | 11/1955 | Stein ............................... 416/144 X |
| 2,771,240 | 11/1956 | Gurin .................................. 416/145 |
| 3,323,597 | 6/1967 | Longobardi et al. ............... 416/144 |
| 3,586,460 | 6/1971 | Toner ................................. 416/144 |
| 1,684,773 | 9/1928 | Marks .......................... 416/144 UX |

Primary Examiner—Everette A. Powell, Jr.
Attorney—Owen and Owen

[57] ABSTRACT

The invention is a fan and blower wheel having hollow annular counterbalance chambers concentric with a central drive shaft. Initial counterbalancing is accomplished by filling one or more of the chambers with a liquid thermosetting plastic containing heavy and light fillers. The fillers segregate under the force of rotation and are hardened in place. Final counterbalancing for dynamic vibrations and for future inbalance caused by dirt build up, corrosion or abrasion is accomplished by partially filling one or more of the remaining concentric annular counterbalance chambers with a dense fluid which is free to move. Preferably, the dense fluid also includes high density material such as lead shot or ball bearings.

9 Claims, 6 Drawing Figures

Patented July 10, 1973 3,744,929
3 Sheets-Sheet 1
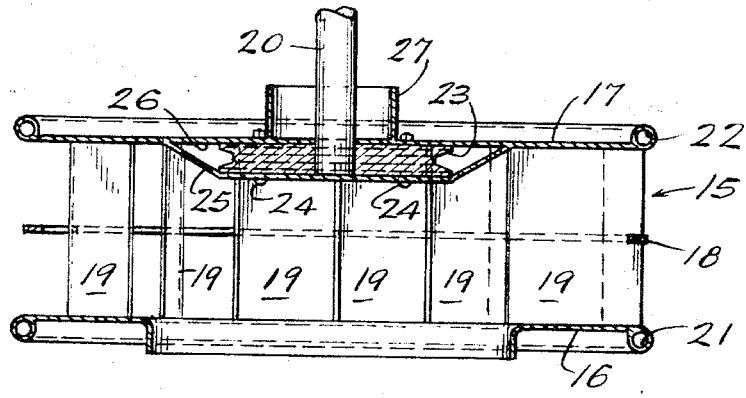
FIG-2-
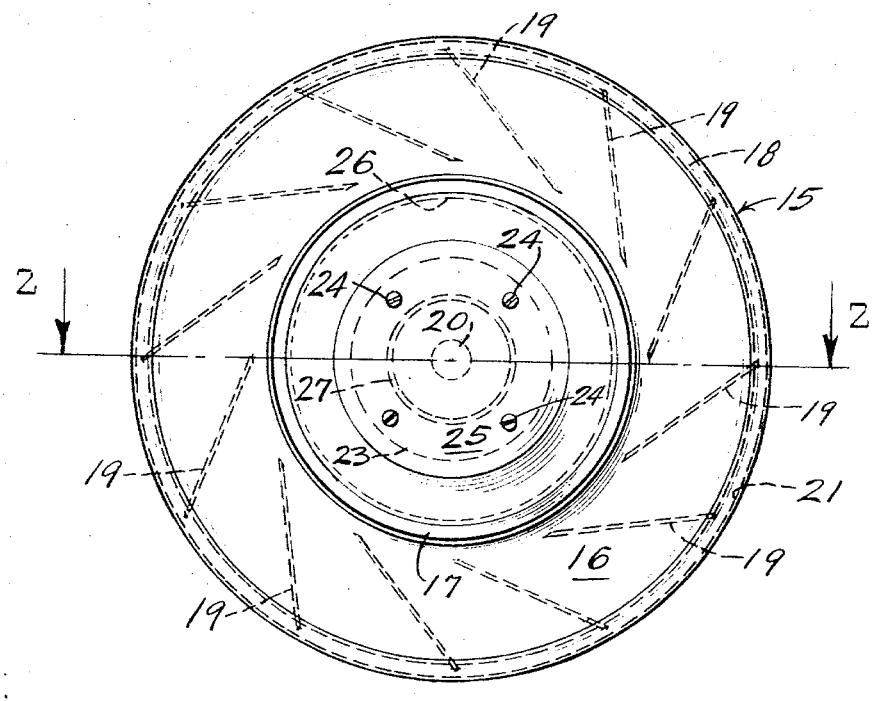
FIG-1-
INVENTOR:
RICHARD L. HUNTINGTON.
BY Owen & Owen
ATT'YS.

Patented July 10, 1973
3,744,929
3 Sheets-Sheet 2
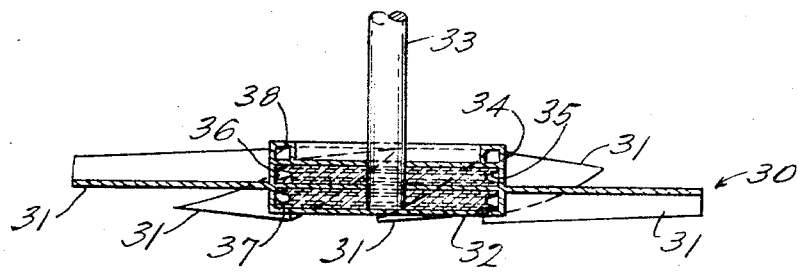
FIG-4-
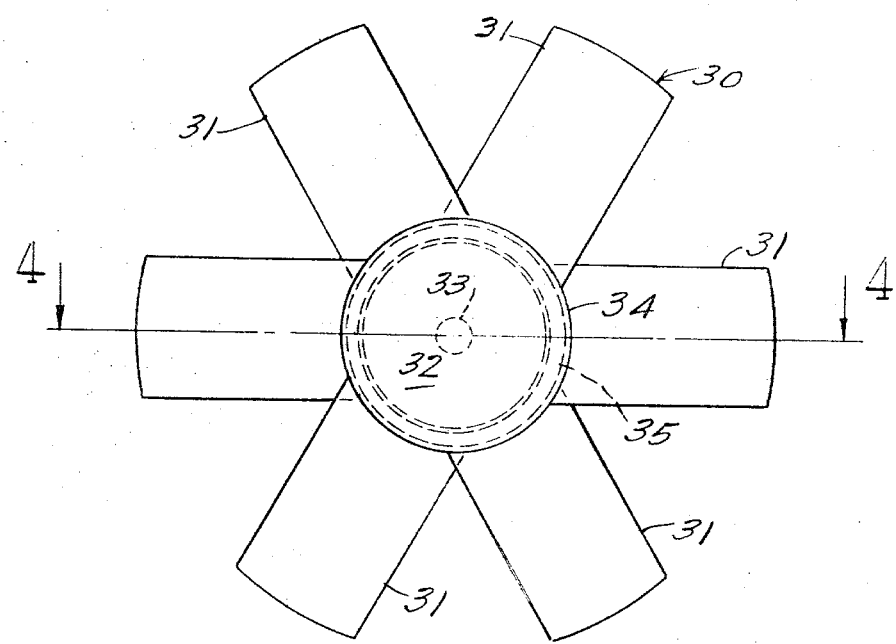
FIG-3-
INVENTOR:
RICHARD L. HUNTINGTON.
BY Owen & Owen
ATT'YS.

Patented July 10, 1973
3,744,929
3 Sheets-Sheet 3
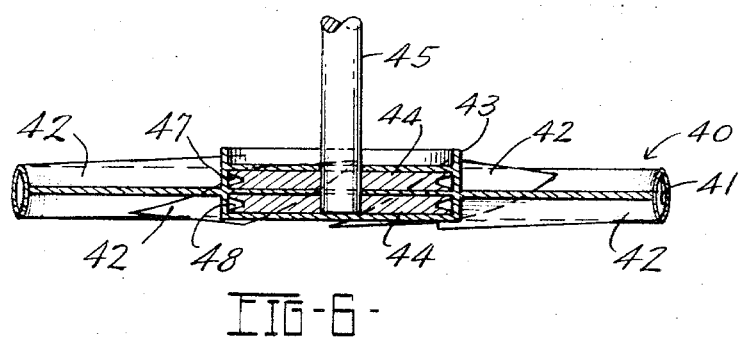
FIG-6-
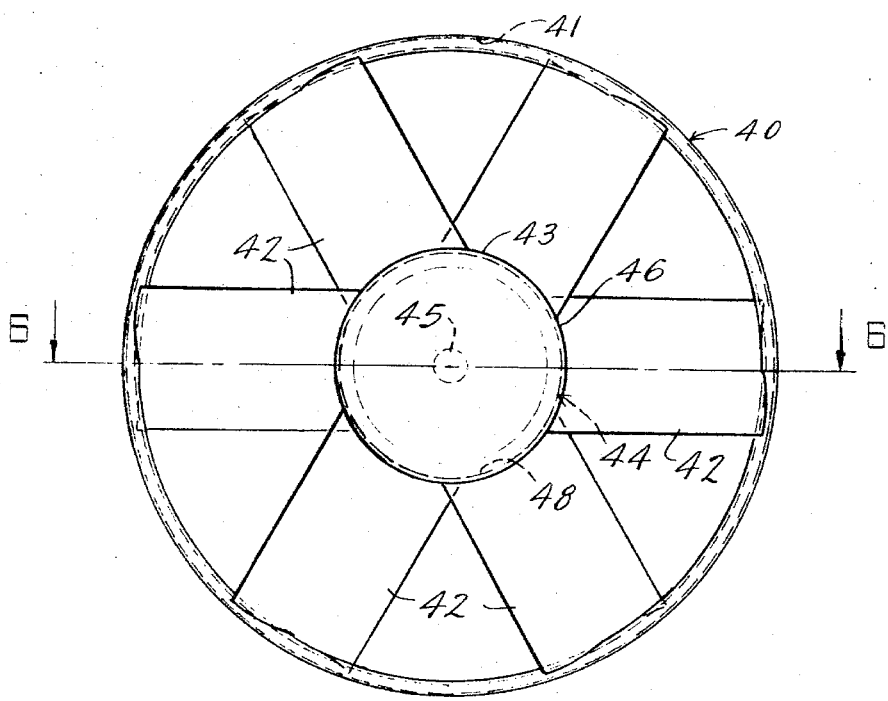
FIG-5-
INVENTOR:
RICHARD L. HUNTINGTON.
BY
Owen & Owen
ATT'YS.

BLOWER AND FAN WHEEL APPARATUS

BACKGROUND OF THE INVENTION

Plastic axial fans and centrifugal blowers commonly in use must be dynamically balanced at or close to operating speed and load due to the low modulus of elasticity of plastics which deflect and stretch when subject to varying centrifugal and load forces. For example, the modulus of elasticity of fiberglass reinforced plastic is on the order of $1 \times 10^6$ psi as compared to $3 \times 10^7$ psi for steel. The relative densities are on the order of 1.8 gm./cm.$_3$ for fiberglass reinforced plastics as compared to 7.0 gm./cm.$^3$ for steel. A comparison of the densities and elasticities of steel and reinforced plastic indicates that stretch due to non-uniform centrifugal force due to non-uniform plastic blade members would be approximately seven times that for a steel counterpart.

Prior art plastic fan and blower wheel inbalance has often resulted in excessive vibrations, noise and excessive tensile stresses which require excessive safety factors and over design. Because of these problems in prior art plastic fan and blower wheels, either the fan and blower wheels were often unsatisfactory or they were used only for secondary uses where the porblems were not critical.

SUMMARY OF THE INVENTION

This invention relates to a blower and axial fan design for air pollution control and, more particularly, to an improved counterbalanced fan and blower wheel.

Blower and axial fan wheels, according to the present invention are dynamically counterbalanced during operation by including one or more annular concentric hollow ring-shaped compartments in the rotating member. The hollow ring-shaped compartments are partially filled with a dense fluid which is free to move and counterbalance centrifugal and operational forces.

Fan and blower wheels are initially permanently counterbalanced by filling one or more of the annular ring-shaped compartments with a liquid thermosetting plastic containing both a dense and low density filler. The fillers are segregated in place by centrifugal force by rotation at design speeds, and the plastic catalyzed in place during the initial balancing operation.

A counterbalancing dense fluid is added to the remaining annular compartments to counterbalance any dynamic imbalance and to dampen or reduce any vibrations.

It is, therefore, an important object of this invention to provide axial fan and blower wheels of improved design, capable of operating at high speeds and efficiency levels while simultaneously operating at low vibration and noise levels.

It is an important object of the present invention to provide quality axial fan and blower wheels constructed of plastic which can be produced in large quantities at a comparatively low cost.

Another object of the present invention is to provide fan and blower wheels which can handle corrosive gases containing air pollutants which will not go out of balance due to corrosion, dirt build up, abrasion and variations in speed, which are safe and require a minimum in maintenance costs.

Still additional objects, benefits, and advantages of this invention will become evident from a study of the following detailed description taken in conjunction with the accompanying drawings.

BRIEF DESCRIPTION OF THE DRAWINGS

FIG. 1 is a front view of a centrifugal blower wheel showing blade, annular ring and hub placement;

FIG. 2 is a sectional top view taken slong the line 2—2 of the blower wheel shown in FIG. 1;

FIG. 3 is a front view of another embodiment of an axial fan wheel showing blade, annular ring and hub placement;

FIG. 4 is a sectional top view taken along the line 4—4 of the fan wheel shown in FIG. 3;

FIG. 5 is a front view of another embodiment of a fan wheel having a peripheral blade annular counterbalance ring; and FIG. 6 is a sectional top view taken along line 6—6 of the fan wheel shown in FIG. 5.

DESCRIPTION OF THE PREFERRED EMBODIMENTS

Referring to FIGS. 1 and 2, a blower wheel according to the present invention is generally indicated by the reference number 15. Preferably, the blower wheel 15 is constructed of plastic. The blower wheel 15 includes an annular gas inlet face member 16, a disk-shaped back plate 17, a central reinforcing member 18 which supports interposed radial blades 19 and an axial drive shaft 20.

The annular gas inlet face member 16 includes a hollow annular-shaped chamber 21 around its periphery. Similarly, the disk-shaped back plate 17 includes a hollow annular chamber 22 around the periphery of said plate.

A central V-belt pulley 23 is affixed to the back plate 17 with fasteners 24. A pulley cover plate 25 forms a hollow annular chamber 26 with the pulley 23 and the back plate 17. An annular shaft shroud 27 extends rearwardly from the back plate 17 and surrounds the shaft 20.

The blower wheel 15 is initially balanced by mounting the blower wheel in a horizontal position, filling the central annular-shaped chamber 26 with a thermosetting resin and a filler of, for example, a powdered lead and hollow spherical particles, for example, saran microballoon particles and rotating the blower wheel at the desired operating speed until the resin sets, thereby affixing the filler "counterbalance." The thermosetting resin is thrown outwardly to the periphery of the annular ring effectively counterbalancing vibrational forces while the lighter saran microballoons are displaced toward the center of the annular ring. The thermosetting resin and filler also reinforces the center of the back plate 17. Either polyester resins or, for example, epoxy resins may be used. Neither polyester nor epoxy thermosets require outside heat or pressure to achieve a permanent set. These thermosets react at room temperature to create tightly crosslinked chain structures. Characteristics and types of thermosets are well known to the art (see 1969–1970 *Modern Plastics Encyclopedia*). Other types of fillers may also be utilized, for examples, barium sulfate or barium oxide.

The annular chambers 21 and 22 are partially filled after the initial counterbalancing operation with a suitable dense fluid such as oil, mercury or a slurry of lead oxide in oil. Preferably lead shot, ball bearings, powdered lead, or similar dense material is included with the mercury or oil, with the dense material free to position itself around the periphery.

In operation, the counterbalance fluid is distributed around the periphery of the counterbalance annular chambers 21 and 22 by centrifugal force and serves to counterbalance operational forces as well as to dampen vibrational forces. The dense material tends to establish its center of gravity opposite the heavier, imbalancing area of the blower wheel 15.

Referring now to FIGS. 3 and 4, an axial fan wheel according to the present invention is generally indicated by the reference number 30. The fan wheel 30 includes blades 31, a central hub 32 mounted on a central shaft 33 and a shaft cowling 34. A double "V" pulley 35 is mounted on the shaft 33 and is embedded in plastic to form the hub 32. The pulley 35 and the cowling 34 define annular counterbalance chambers 36, 37, and 38.

Initial fan balancing in this design is achieved by mounting the fan in a horizontal position, filling the central compartment 36 with resin containing powdered lead filler and saran microballoons, and rotating the wheel at the desired balancing speed until the resin has set. The outer annular counterbalancing chambers 37 and 38 are then partially filled with a dense counterbalance fluid.

Referring to FIGS. 5 and 6, an axial fan wheel, according to the present invention, is generally indicated by the reference number 40. The fan wheel 40 includes a hollow annular peripheral chamber 41, interconnecting radial fan blade 42 and a central hub 43. The hub 43 includes a "V" belt pulley 44 mounted on a central drive shaft 45. A shaft cowling 46 and the pulley 44 defines annular and counterbalance chambers 47 and 48.

The fan wheel 40 is initially counterbalanced by adding a thermosetting plastic, containing a dense and light filler to one or more of the central annular compartments 47–48 and rotating at operational speeds until the plastic has set. The annular counterbalance chamber 41 is then partially filled with a dense fluid. As mentioned above, the thermosetting resin may be either a polyester resin or an epoxy resin. Suitable dense fillers are, for examples, powdered lead or iron filings, while the light filler may be, for examples, saran mircoballoon particles or wood particles.

While the invention has been described with particular reference to the embodiments shown in the drawings, many changes may be made in the detailed construction to accommodate variations in the method of manufacture. It shall be understood that such changes shall be within the spirit and scope of the present invention as defined by the appending claims.

What I claim is:

1. Blower and fan wheel apparatus comprising in combination, a hub having an axis of rotation, a circular back plate attached to said hub, a cover plate attached to said hub and to said back plate, said cover plate, said back plate and hub defining an annular central chamber concentric to such axis of rotation, such chamber being at least partially filled with a thermoset resin, a high density filler and a lower density filler, a circular face member spaced from said rear plate, a plurality of interconnecting radially positioned blades mounted between said back plate and said face member, a first hollow, annular chamber defined on the periphery of said back plate, and a second hollow, annular chamber defined on the periphery of said face member, said first and second hollow chambers containing a dense fluid which is free to move under the centrifugal forces created by blower wheel rotation.

2. Blower and fan wheel apparatus comprising, in combination, a shaft having an axis of rotation, a plurality of annular, hollow chambers concentric to such axis of rotation, and a plurality of blades extending outwardly of said shaft, one of said chambers being at least partially filled with a thermoset resin, a high density filler and a low density filler, whereby said resin and said fillers are solidified to form a counterbalancing means, the remaining chambers being at least partially filled with a dense fluid which is free to move under the centrifugal forces created by fan wheel rotation.

3. Blower and fan wheel apparatus comprising, in combination, a shaft having an axis of rotation, a plurality of blades positioned outwardly of said shaft and a plurality of hollow chambers concentric to such axis of rotation, at least one of said chambers being at least partially filled with a mixture of thermoset resin and filler, whereby said mixture is set to form a counterbalancing means, said remaining chamber or chambers being filled with a dense fluid which is free to move under the centrifugal forces created by fan wheel rotation.

4. Apparatus according to claim 3 wherein said filler includes a low density and a high density filler and wherein said low density filler consists essentially of hollow spherical particles.

5. Apparatus according to claim 4 wherein said high density filler consists essentially of metal particles.

6. Apparatus according to claim 3, wherein said dense fluid consists essentially of a slurry of lead oxide in oil.

7. Apparatus according to claim 3, wherein said dense fluid comprises a mixture of a fluid and high density spherical balls.

8. Apparatus according to claim 1, wherein said dense fluid comprises a mixture of a fluid and high density spherical balls.

9. Apparatus according to claim 2, wherein said dense fluid comprises a mixture of a fluid and high density spherical balls.

* * * * *